J. B. DUMAS.
STEAM TURBINE FOR LOCOMOTIVES.
APPLICATION FILED APR. 11, 1911.

1,010,878.

Patented Dec. 5, 1911.

2 SHEETS—SHEET 1.

Witnesses

Inventor
Joel B. Dumas
By Victor J. Evans
Attorney

J. B. DUMAS.
STEAM TURBINE FOR LOCOMOTIVES.
APPLICATION FILED APR. 11, 1911.

1,010,878.

Patented Dec. 5, 1911.

2 SHEETS—SHEET 2.

Witnesses
Fenton S. Belt

Inventor
Joel B. Dumas
By Victor J. Evans
Attorney

UNITED STATES PATENT OFFICE.

JOEL BENJAMAN DUMAS, OF COLEMAN, TEXAS.

STEAM-TURBINE FOR LOCOMOTIVES.

1,010,878.  Specification of Letters Patent.  Patented Dec. 5, 1911.

Application filed April 11, 1911. Serial No. 620,304.

*To all whom it may concern:*

Be it known that I, JOEL BENJAMAN DUMAS, a citizen of the United States, residing at Coleman, in the county of Coleman and State of Texas, have invented new and useful Improvements in Steam-Turbines for Locomotives, of which the following is a specification.

This invention relates to steam turbines for locomotives or similar vehicles, the object of the invention being to provide a compact mechanism having positive geared connections with the driving axles of the locomotive eliminating friction between the driving parts to a great extent, thereby insuring the most efficient driving action of the axles at a minimum expenditure of the elastic fluid to be utilized in running the turbine.

Figure 1:
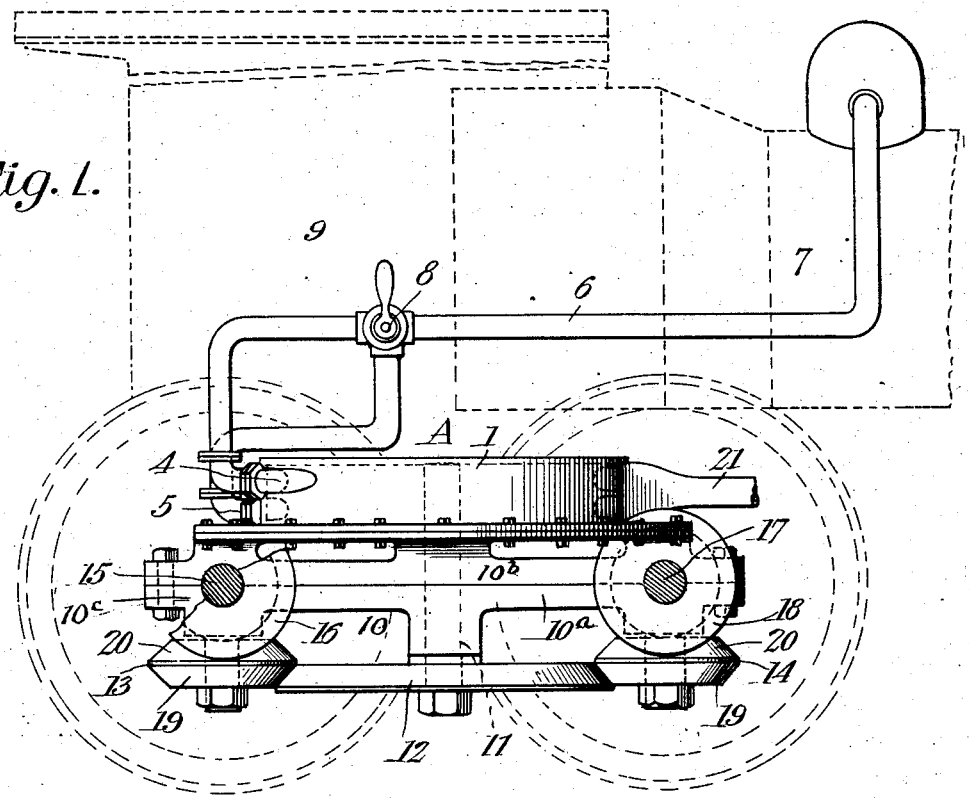
Figure 2:
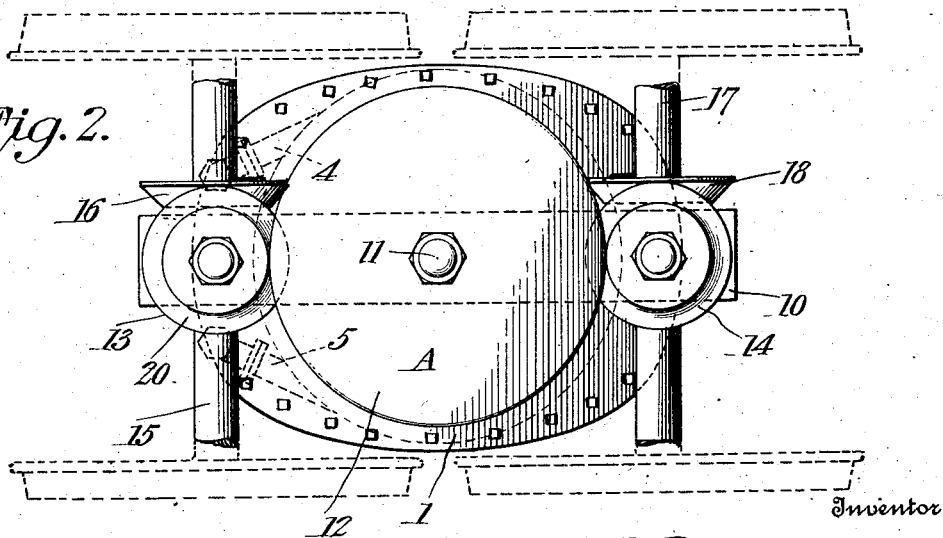
Figure 3:
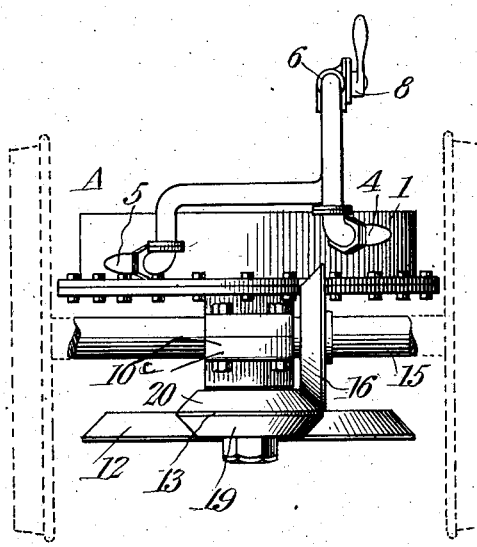
Figure 4:
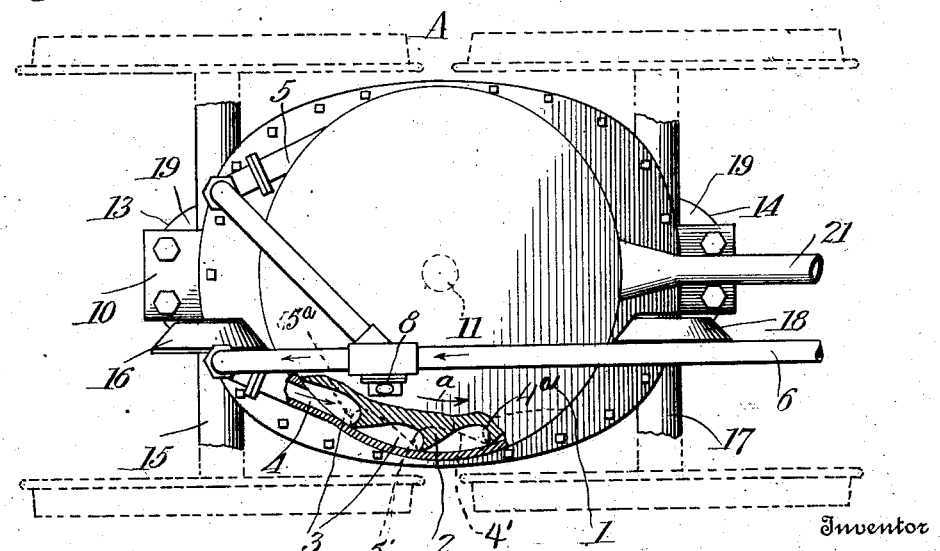

In the drawings, forming a portion of this specification and in which like numerals of reference indicate similar parts in the several views:—Figure 1 is a side elevation of a locomotive constructed in accordance with the present invention. Fig. 2 is a bottom plan view thereof. Fig. 3 is a vertical section taken on the line 3—3 of Fig. 1. Fig. 4 is a horizontal section through the turbine casing showing a portion of the turbine wheel in section.

The present invention contemplates the provision of a turbine of the type shown at A, the said turbine comprising a casing 1 having rotatably mounted therein a wheel 2. The wheel is provided with rows of steam pockets 3 and 4ᵃ which are arranged in direct communication with the fluid intake pipes 4 and 5 which are connected with the main connection 6 from the boiler 7. The pipe 6 is provided with a suitable well known valve which can be operated to permit the steam to pass into either one of the pipes 4 or 5.

The wheel 2 of the turbine has secured thereto a driving shaft 11 which carries a friction disk 12. This disk contacts with similar disks 13 and 14 which are journaled in suitable bearings on the supporting frame of the turbine. The driving axle 15 of the locomotive is provided with a friction disk 16 which contacts with the disk 13. The driving axle 17 is provided with a friction disk 18 which contacts with the disk 14. The disks 13 and 14 may be of any well known approved construction which may be found most desirable for the purpose intended, but as illustrated, each is formed with the beveled surface 19 engaging the disk 12 and the beveled surface 20 which engages the friction disks on the driving axles 15 and 17 respectively.

The pockets 4ᵃ of the turbine wheel have their impact surfaces 4' extending in a reverse direction from the axis of the wheel to the direction of the impact surfaces 5' of the pockets 5ᵃ, and as shown, the intake pipes 4 and 5 open into the pockets at opposite sides of the vertical axis of the wheel, so that the wheel can be propelled in either direction at the will of the operator.

When the valve 8 in the branch fluid intake pipe 5 is closed and the valve in the branch intake pipe 4 open, steam from the boiler will take the course indicated by the arrows shown in Fig. 4 of the drawings. The wheel 2 of the turbine will be propelled in the direction of the arrow *a* and through the described geared connections between the driving shaft 11 of the wheel and the driving shafts 15 and 17 respectively of the locomotive, the latter will be propelled in a forward direction. Should it be desired to reverse the movement of the locomotive, the valve 8 in the fluid intake pipe 4 is closed and the valve in the opposite intake pipe is open, the pressure of the fluid against the wheel 2 acting to revolve the wheel 2 in an opposite direction.

The turbine conventionally shown herein may be of any well known construction which may be most suited for the purpose, however, I desire to use the one illustrated because when arranged horizontally, as shown, it can be placed or associated in the most compact manner with the driving gearing described.

The casing 1 is provided with a suitable exhaust 21. The casing 1 is mounted on a support 10 which comprises the members 10ᵃ and 10ᵇ the said member 10ᵃ being provided with a centrally depending annular portion, and said member 10ᵇ being provided with a centrally upwardly extending annular portion so that when the members are operatively connected, both of the said annular portions forming a bearing for the driving shaft 11 and having the bearing portions 10ᶜ which are fitted to the axles 15 and 17.

While the invention as described is designed particularly for use upon locomotives, it is obvious that its use is unlimited, its construction being such that it may be used in connection with various forms of steam engines, including those of the stationary type, and boilers, traction engines or other forms of portable engines. It is also obvious that one or more of such turbines can be used according to the character of the work to which the apparatus may be put. It may also be stated that the turbine can be disposed either horizontally, as shown, or vertically if desired.

I claim—

In a turbine driven locomotive, a horizontally disposed casing located between the driving axles of the locomotive, an impact wheel revolubly mounted within the casing, a fluid conveying pipe, said wheel provided with a depending driving shaft, and having a plurality of peripheral pockets, one of the series of pockets having their impact surfaces extending in an opposite direction from the axis of the wheel from the impact surfaces of the pockets of the other series, a support connecting the casing with the driving axle, the said support comprising two members, the upper member being provided with a centrally upwardly extending annular portion, and the lower member being provided with a centrally depending annular portion, both annular portions forming a bearing for the driving shaft, the said driving shaft being provided with geared connections with the driving axles of the locomotive, branch pipes connected with the fluid supply pipe and opening into the casing on the opposite sides of the vertical axis of the wheel for discharging the fluid, into the pockets, and a controlling valve at the point of connection of the branch pipes with the said fluid pipe.

In testimony whereof I affix my signature in presence of two witnesses.

JOEL BENJAMAN DUMAS.

Witnesses:
F. J. WHITE,
J. M. PARKER.

---

Copies of this patent may be obtained for five cents each, by addressing the "Commissioner of Patents, Washington, D. C."